US012382882B2

(12) United States Patent  
Nowé et al.

(10) Patent No.: US 12,382,882 B2  
(45) Date of Patent: Aug. 12, 2025

(54) GREENHOUSE

(71) Applicant: VAN DER HOEVEN HORTICULTURAL PROJECTS B.V., Den Hoorn (NL)

(72) Inventors: Willem Nowé, 's-Gravenzande (NL); Vincent Martijn Kickert, Den Hoorn (NL)

(73) Assignee: Van der Hoeven Horticultural Projects B.V., Den Hoorn (NL)

( * ) Notice: Subject to any disclaimer, the term of this patent is extended or adjusted under 35 U.S.C. 154(b) by 185 days.

(21) Appl. No.: 18/107,061

(22) Filed: Feb. 8, 2023

(65) Prior Publication Data

US 2023/0180676 A1 Jun. 15, 2023

Related U.S. Application Data

(62) Division of application No. 16/955,918, filed as application No. PCT/NL2018/050876 on Dec. 21, 2018, now Pat. No. 11,596,111.

(30) Foreign Application Priority Data

Dec. 22, 2017 (NL) ..................... 2020176

(51) Int. Cl.  
*A01G 9/14* (2006.01)  
*A01G 9/24* (2006.01)  
(Continued)

(52) U.S. Cl.  
CPC ........... *A01G 9/1407* (2013.01); *A01G 9/241* (2013.01); *A01G 9/246* (2013.01); *E04B 7/163* (2013.01); *E04D 13/174* (2013.01)

(58) Field of Classification Search  
CPC ........... E04D 13/174; E04D 2003/0875; E04B 7/163; A01G 9/241; A01G 9/246  
See application file for complete search history.

(56) References Cited

U.S. PATENT DOCUMENTS 595,960 A * 12/1897 May ..................... E04D 13/174  
    52/278  
5,498,205 A * 3/1996 Knowles .................. F24F 7/02  
    454/363  
(Continued)

FOREIGN PATENT DOCUMENTS

CN      1658751 A     8/2005  
DE     14 54 648 A     1/1969  
(Continued)

OTHER PUBLICATIONS

Written Opinion of the International Searching Authority and International Search Report in International Patent Application No. PCT/NL2018/050876, dated Apr. 24, 2019.

(Continued)

*Primary Examiner* — Christine T Cajilig  
(74) *Attorney, Agent, or Firm* — Venable LLP

(57) ABSTRACT

A process for conditioning the air within a greenhouse comprising transparent walls and a structure including one or more ridge beams as part of a roof of the greenhouse. The process comprises maintaining a pressure difference between an average pressure within the greenhouse and a pressure exterior to the greenhouse, taking in air from the exterior of the greenhouse and mixing this air with air taken from the interior of the greenhouse to obtain conditioned air, distributing the conditioned air via a forced flow to the interior of the greenhouse, and discharging a volume of air from the interior of the greenhouse via openings present in the one or more ridge beams such to maintain the pressure difference.

18 Claims, 7 Drawing Sheets

(51) Int. Cl.
*E04B 7/16* (2006.01)
*E04D 13/17* (2006.01)

(56) References Cited

U.S. PATENT DOCUMENTS

| | | | | |
|---|---|---|---|---|
| 5,706,618 | A * | 1/1998 | Pratt | E04D 13/174 454/364 |
| 6,662,816 | B1 * | 12/2003 | Cunningham | E04H 15/16 135/93 |
| 6,705,043 | B1 | 3/2004 | Opdam et al. | |
| 7,228,657 | B2 * | 6/2007 | Brault | A01G 9/246 47/17 |
| 2006/0172696 | A1 * | 8/2006 | Cook | E04D 13/174 454/365 |
| 2008/0000151 | A1 | 1/2008 | Houweling et al. | |
| 2010/0126062 | A1 * | 5/2010 | Houweling | A01G 9/14 47/17 |
| 2013/0074428 | A1 * | 3/2013 | Allen | E04D 13/174 52/302.1 |
| 2016/0157440 | A1 | 6/2016 | Looije et al. | |
| 2019/0150376 | A1 * | 5/2019 | Spaans | A01G 9/246 |

FOREIGN PATENT DOCUMENTS

| | | |
|---|---|---|
| DE | 1679495 A1 * | 3/1971 |
| DE | 3432631 A | 3/1986 |
| DE | 84 26 219 U1 | 5/1987 |
| EP | 0 334 215 A | 9/1989 |
| EP | 1464219 A1 | 10/2004 |
| FR | 2494555 A1 * | 5/1982 |
| FR | 2 660 832 A | 10/1991 |
| FR | 2 745 369 | 8/1997 |
| GB | 588 800 A | 6/1947 |
| JP | S59-8565 U | 1/1984 |
| WO | 2004/032606 A1 | 4/2004 |
| WO | 2011/028100 A1 | 3/2011 |

OTHER PUBLICATIONS

Dec. 20, 2022 Office Action in Japanese Patent Application No. 2020-534367 (with English translation).

* cited by examiner

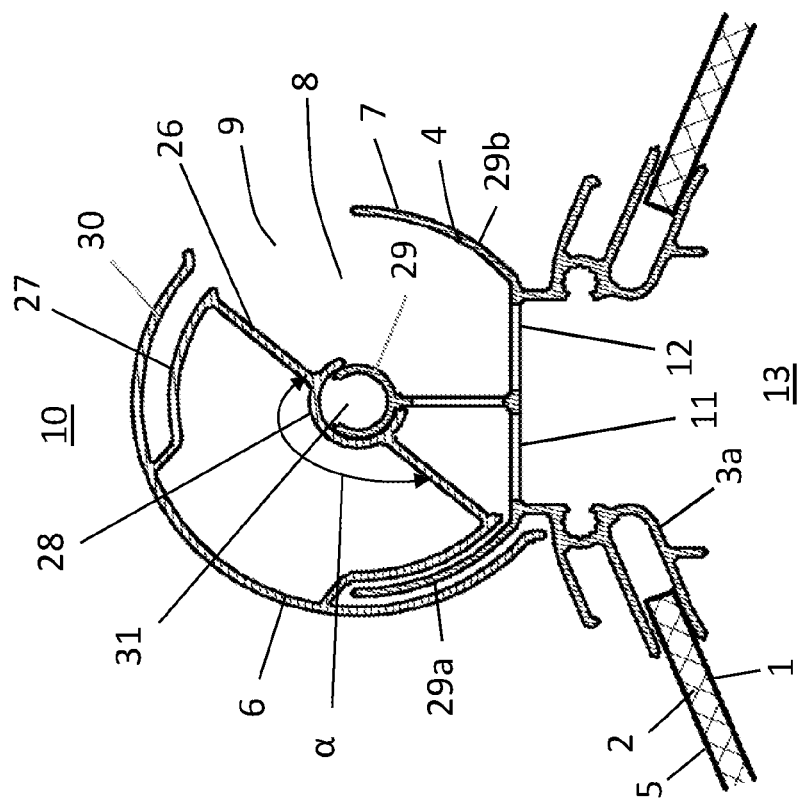
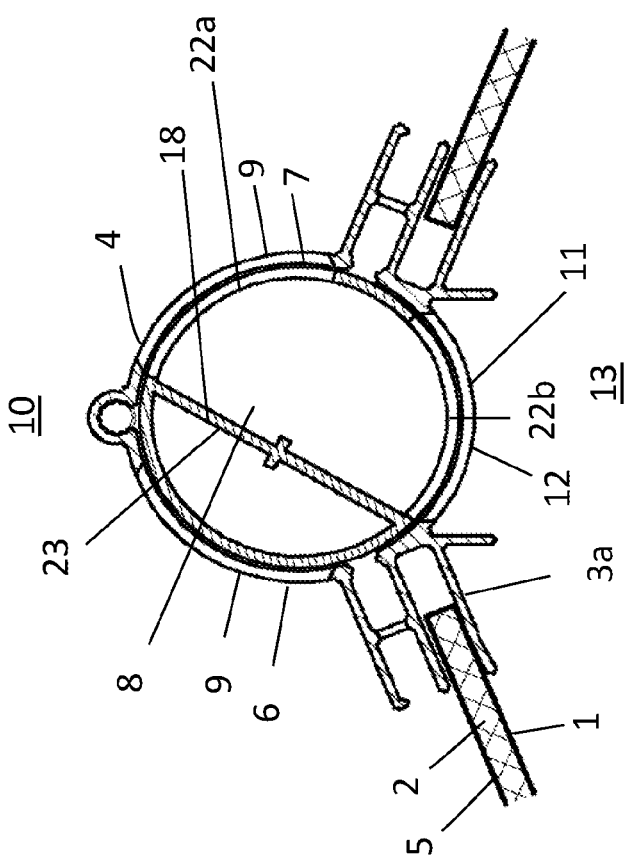
Fig. 1
Fig. 2

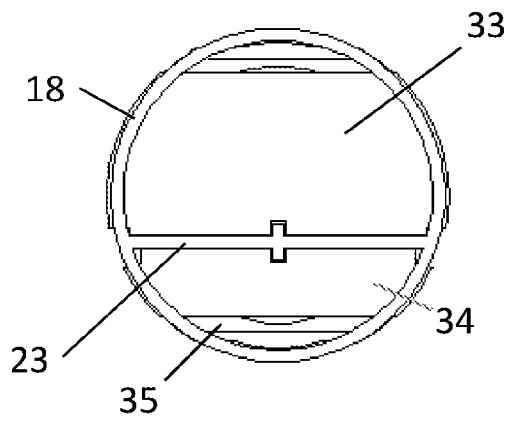 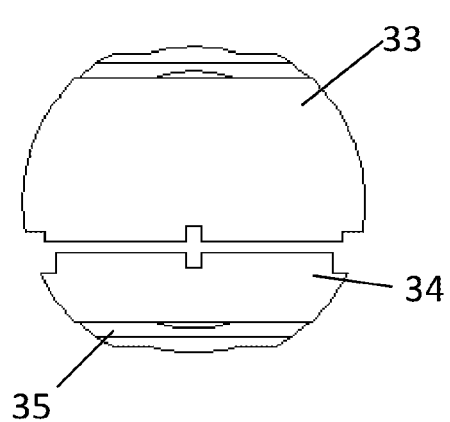
Fig. 3  Fig. 4
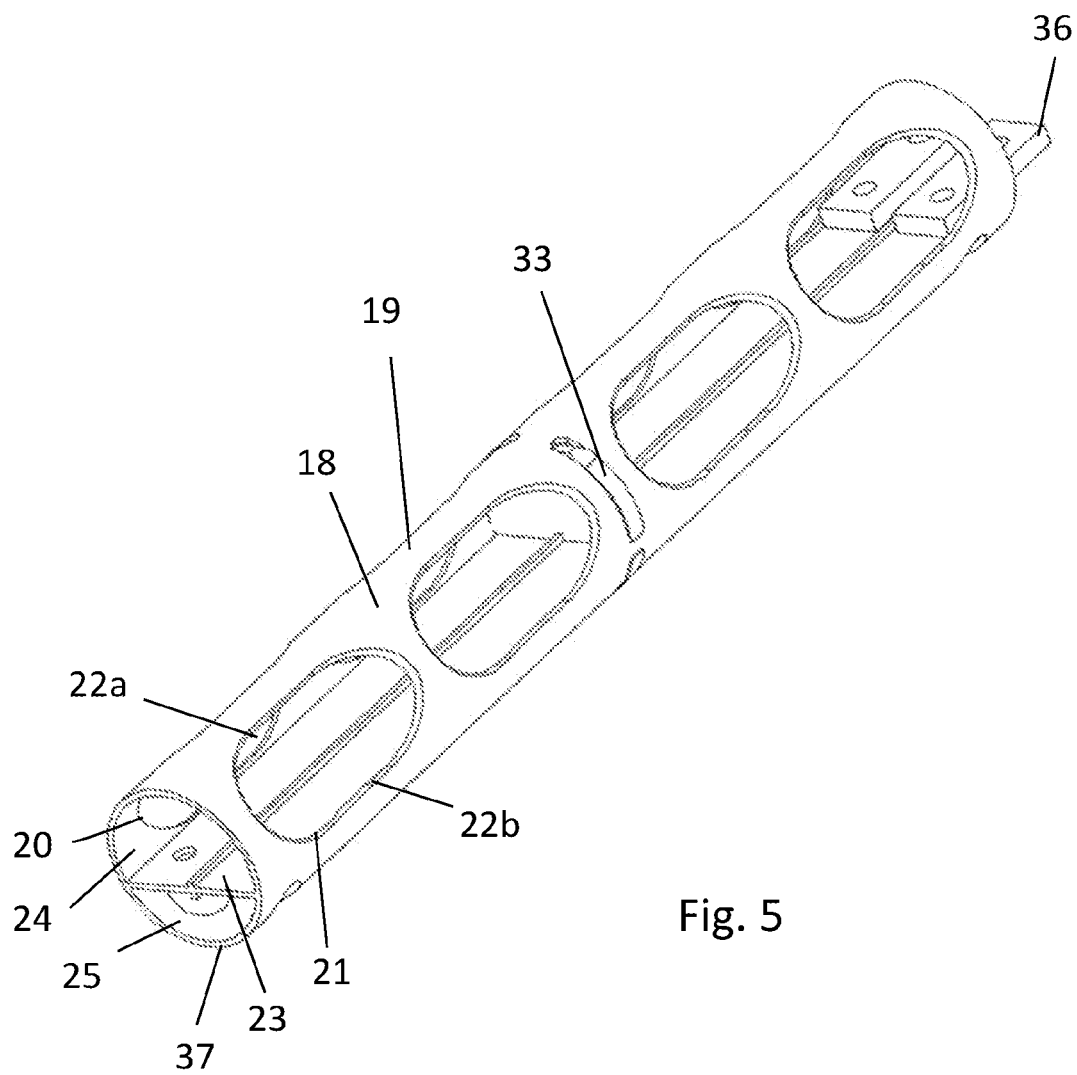
Fig. 5

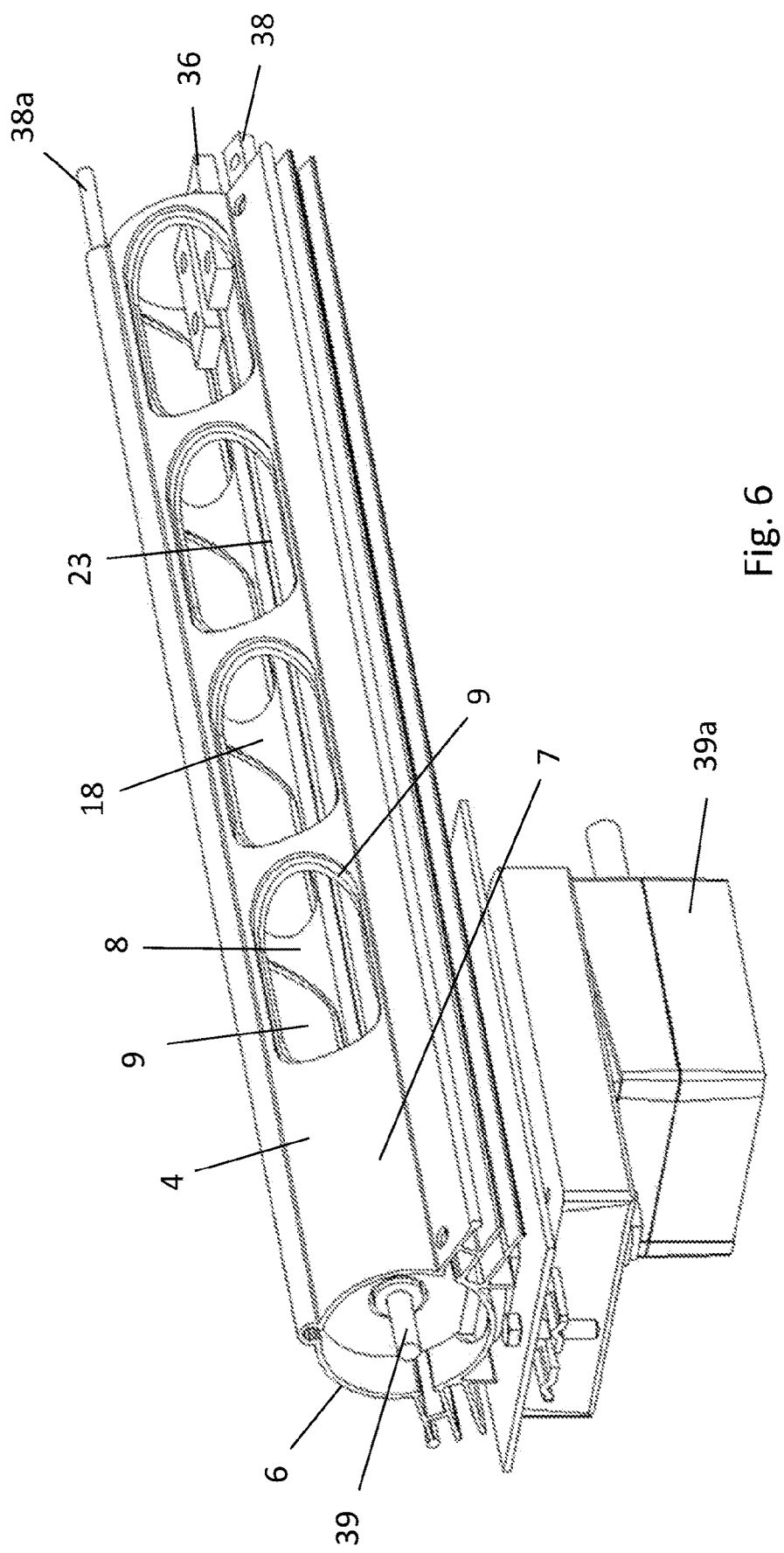

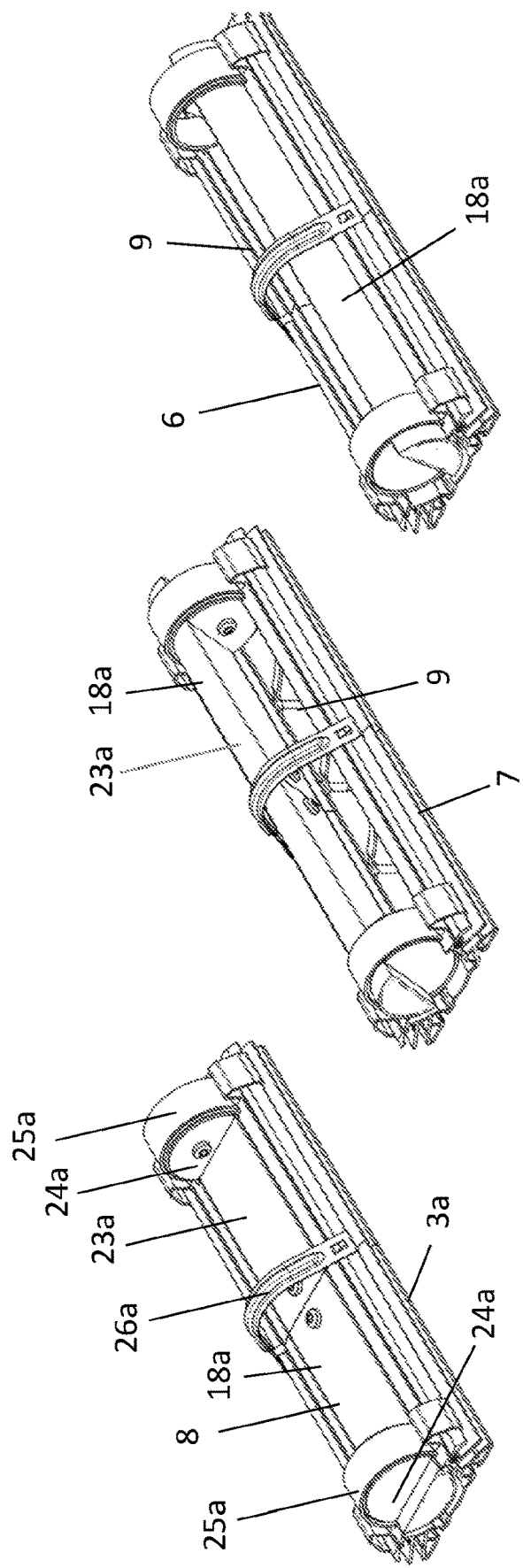

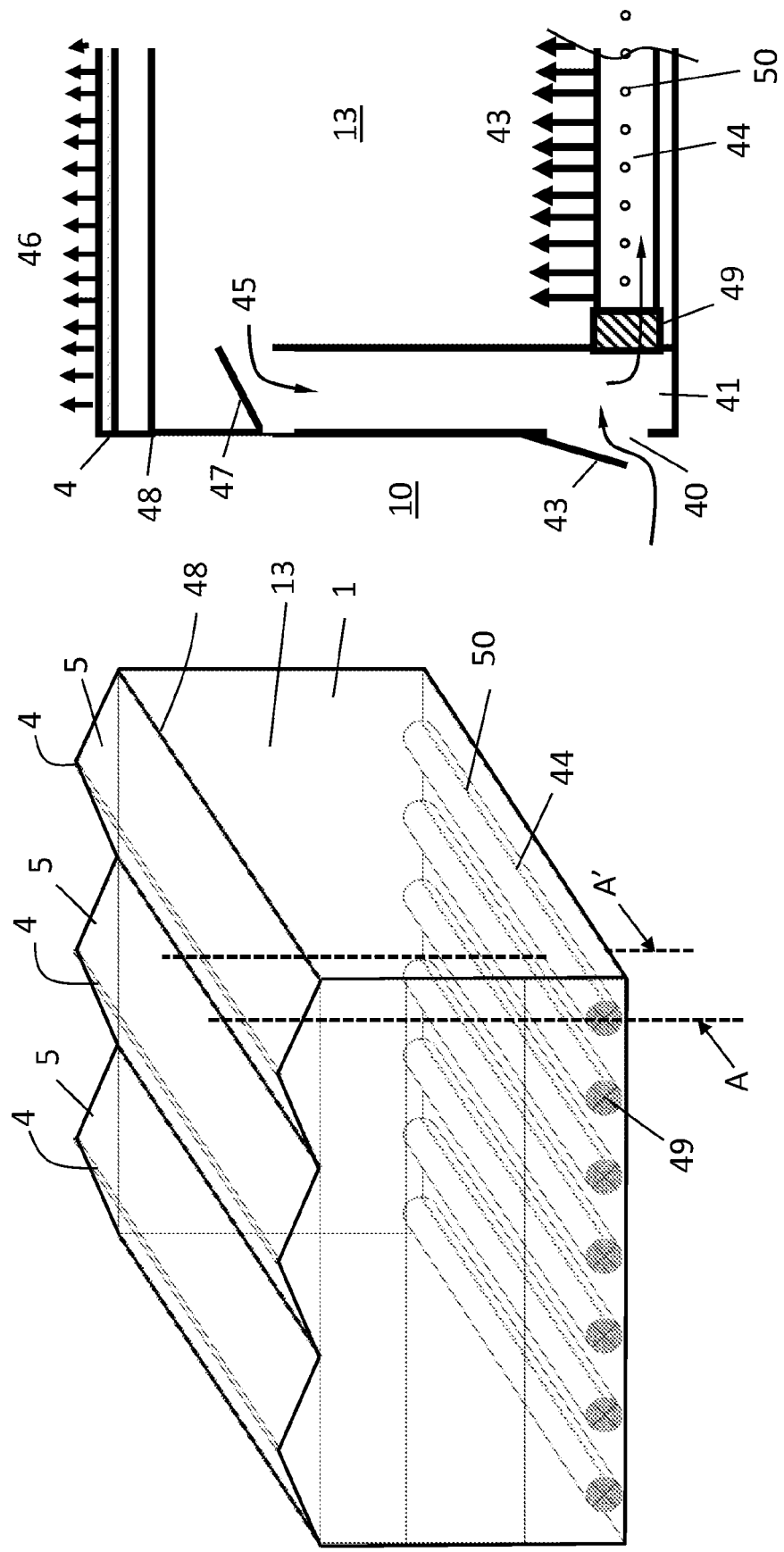

GREENHOUSE

This application is a national stage entry of International Patent Application No. PCT/NL2018/050876, filed Dec. 21, 2018, which is incorporated by reference in its entirety.

This application claims priority to Netherlands Patent Application No. 2020176, filed Dec. 22, 2017, which is incorporated by reference in its entirety.

BACKGROUND

The invention is directed to a greenhouse comprised of transparent walls and a structure comprising of one or more ridge beams as part of a roof of the greenhouse. The invention is also directed to a novel ridge beam. The invention is also directed to a method to condition the air within a greenhouse.

DE8426219 describes a building with a ventilating ridge beam. The beam construction is provide with two elongated flaps which can simultaneously open and close thereby providing a ventilation opening.

DE1454648 describes a greenhouse provided with a window near the ridge beam allowing air to escape the greenhouse.

Such a greenhouse is described in WO17176114. In FIGS. 1 and 2 a schematic representation of a greenhouse with a saddle roof is shown. In the roof ventilating windows are present to discharge excess air from the interior of the greenhouse to the exterior of the greenhouse. Such ventilating windows are typically present in every saddle roof at a regular interval. A disadvantage of such ventilating windows is that the frames and controls to operate the window take away light and thus negatively affect the efficiency of the greenhouse to grow plants. Furthermore, local pressure differences and temperature differences may result from the internal gas flows towards these windows.

SUMMARY OF THE INVENTION

The object of the present invention is to provide a greenhouse which has a higher efficiency of the available sun light and avoids the local pressure differences and temperature differences.

This is achieved by the following greenhouse. Greenhouse comprised of transparent walls and a structure comprising of one or more ridge beams as part of a roof of the greenhouse, wherein the ridge beam extends some distance above the roof defining two elongated side zones present above the roof and at either side of the ridge beam, wherein the ridge beam is comprised of one or more elongated hollow spaces, wherein the ridge beam is provided with one or more closable openings in both side zones which openings fluidly connect the exterior of the greenhouse with the one or more elongated hollow spaces of the ridge beam, and wherein the ridge beam is provided with one or more openings at its lower end fluidly connecting the interior of the greenhouse with the one or more elongated hollow spaces of the ridge beam.

The greenhouse according to the invention will have less light blocking parts near the roof of the greenhouse than the prior art greenhouse. Furthermore, a more even discharge of air from within the greenhouse to its exterior via the roof is possible. This will decrease the local pressure and temperature differences within the greenhouse. Further advantages will be discussed when describing the preferred embodiments of the invention.

The ridge beam may suitable be provided with an elongated valve to direct air from within the greenhouse to one side of the ridge beam. This is advantageous because the operator or computer operating the greenhouse can open de openings in the ridge beam at the leeward side or windward side in case a wind is blowing over the greenhouse. Openings at the leeward side is preferred when air is to be discharged from the greenhouse to its exterior and openings at the windward side is preferred when air is to enter the greenhouse from its exterior. Preferably the openings in the ridge beam are used to discharge air from the greenhouse to its exterior. In a prior art greenhouse the ventilating windows are typically positioned at the leeward side of a roof for the locally most predominant wind direction. The greenhouse according to this invention enables one to discharge air via a leeward opening independent of the wind direction. In a prior art greenhouse the ventilating windows would have to be shut when the wind blow from the wrong direction at a certain high wind speed. By wrong direction is here for example meant that the wind blows into the openings of the ventilating windows. This mandatory closing of the windows is not preferred because it limits the possibilities for conditioning the air within the greenhouse. In the greenhouse having the ridge beam as here described such safety shutting of the ventilation openings is not required because one can always use the openings in the ridge beam at its leeward side.

The valve has at least a first position wherein the one or more openings in a first elongated side zone fluidly connect the exterior of the greenhouse with the one or more elongated hollow spaces of the ridge beam and wherein the one or more openings in the opposite and second elongated side zone are closed, a second position wherein the one or more openings in the second elongated side zone fluidly connect the exterior of the greenhouse with the one or more elongated hollow spaces of the ridge beam and wherein the one or more openings in the first elongated side zone are closed. By closed is here also meant substantially closed. There may be gas passages from the hollow space of the ridge beam to the closed openings as illustrated in FIGS. 1, 2, 9 and 10 by which a very small amount of air may pass towards the exterior of the greenhouse. Such small volumes of air are however considered insignificant for the working of the ridge beam.

Preferably the valve has a third position which results in that the interior of the greenhouse is not fluidly connected to the exterior of the greenhouse via the openings of the ridge beam. This may be by enclosing the openings in the two elongated side zones and/or by enclosing the one or more openings at its lower end of the ridge beam. Preferably the valve has intermediate positions wherein the size of the one or more opening in one of the two elongated side zones and/or the size of the opening at the lower end of the ridge beam can be varied while the one or more openings of the other elongated side zone are closed. This is advantageous because one can then fully close the greenhouse and control the volume of air being discharged from the interior of the greenhouse to its exterior.

The valve may be one or more screens which can move in the elongated direction of the ridge beam and close or open the openings at either of the elongated size zones depending on its position relative to the two elongated zones. For example the openings in the two elongated zones may be openings in an upwardly extending wall which is covered by an elongated and moveable top having at either elongated side a downwardly directed screen also provided with openings. The screen may run within the two upwardly extending walls or preferably outside the two upwardly extending walls. The openings in the screen may or may not align with the openings in the upwardly extending walls depending on the position of the moveable top. The openings may be alternatingly positioned in the two screens when viewed along the length of the screens or alternatingly positioned in the upwardly extending walls when viewed along the length of the walls. The top may be moved by well known techniques.

Instead of the top with screens the longitudinal moveable valve may also be a tube placed within a hollow space of the ridge beam having a tubular shape. The tubular valve is then co-axially moveable within this tubular hollow space.

The valve preferably changes from one position to another position by rotation along an axis running parallel with the ridge beam. The valve may also rotate along more than one axis running parallel with the ridge beam. The valve is suitably connected to a means to rotate the valve in case the valve changes position by rotation along one axis. Such a means may be a tubular motor. The valve is suitable rotatably connected to a motor positioned below the ridge beam via a transmission, for example a bevel gear. Although this motor may block some light it is not as much as would be by the prior art means to open and close the ventilating windows. The valve is suitably connected to a means to tilt the valve in case the valve changes position by rotation along more than one parallel axis.

The valve may have any design which makes it suitable to achieve one or more of the above described positions. In one preferred design the hollow space of the ridge beam has a tubular shape and wherein the valve is rotatably positioned within this tubular hollow space. Suitably this valve is a tube provided with two parallel rows of openings. The tube further has an elongated surface separating the inner tubular space of the valve into an elongated space fluidly connected to the two rows of openings and a remaining space. This remaining is suitably an elongated enclosed space defined by the elongated surface and part of the tubular wall. In order to avoid that the tube-shaped valve gets jammed within the tubular hollow space sliding surfaces are preferably provided. Such surfaces may be part of the stationary ridge beam or part of the rotating valve. Such surfaces may for example be made of messing, Teflon or engineering plastics such as polyamide, for example Nylon. The ridge beam and the tubular shaped valve may be made of aluminium, steel or alloys comprising these metals.

In another preferred embodiment the valve is an elongated rotating cap valve as here described. The upper end part of the ridge beam is an elongated cap valve which can rotate along an axis running parallel with the ridge beam and which axis runs within the hollow space of the ridge beam. The cap valve is shaped such that in a first rotatable position one or more openings in the first elongated side zone are present which fluidly connect the exterior of the greenhouse with the elongated hollow space of the ridge beam and wherein the second elongated side zone is closed by the cap valve and in a second rotatable position one or more openings in the second elongated side zone are present which fluidly connect the exterior of the greenhouse with the elongated hollow space of the ridge beam and wherein the first elongated side zone is closed by the cap valve.

In another preferred embodiment the valve is comprised of a first wall part as one elongated side zone and a second wall part as the opposite elongated side zone, wherein the wall parts are rotatably connected to the fixed part of the ridge beam at their lower ends. The wall parts are further both rotatably connected to an elongated bridging part at their upper ends. The axis of rotation of all four rotatable connections run parallel with the elongated ridge beam. This structure enables that the bridging part can tilt in different positions, wherein in at least one position the bridging part closed the openings in one wall part and provides a fluid connection between the exterior of the greenhouse and the hollow spaces via the openings of the other wall part, and wherein in at least another position the bridging part closes the openings of first and second wall part.

The area of openings in the ridge beam per axial length of the ridge beam is preferably between 0.01 and 0.1 $m^2/m$ and more preferably between 0.01 and 0.04 $m^2/m$. The ridge beam is suitably not a wide construction. The external width is preferably below 0.11 m. such to avoid that the ridge beam itself blocks too much sunlight. The openings are here defined as the maximum allowable opening. Thus expressly not the sum of open and closed openings.

The ridge beam running along the length of the roof of a greenhouse may be provided in sections, wherein each section is provided with a valve which can be independently operated from the remaining valves. This allows one to vary the volume of air which is discharged along the length of the ridge beam.

The roof of the greenhouse may have the shape of a number of parallel oriented saddle roofs each provided with the ridge beam. Such a greenhouse may have any type of transparent walls, suitably glass or polycarbonate. Such transparent walls are suitably fixed in a frame work. The ridge beam is suitably part of such a frame work providing the structure of the greenhouse itself. The greenhouse may also be of the tunnel type and wherein the transparent walls are transparent polymer sheets. At the upper end of the tunnel the ridge beam is provided running in the same direction as the elongated tunnel. More than one tunnel may be positioned in parallel forming one space.

The greenhouse is suitably a so-called semi-closed greenhouse. Such a greenhouse is suitably provided with means to take in air from the exterior of the greenhouse, an air conditioning mixing zone suited to mix air from the exterior of the greenhouse with air from within the greenhouse and means to distribute air from the air conditioning zone to the interior of the greenhouse via a multitude of ventilation ducts fluidly connected to the air conditioning mixing zone.

Such a greenhouse will be typically operated with a small over pressure resulting in that the flow direction in the openings of the ridge beam will be from the interior to the exterior of the greenhouse. This avoids that insects can enter the greenhouse and may avoid additional measures such as netting and the like. The pressure within the greenhouse may be between 0 and 100 Pa higher and preferably between 10 and 20 Pa higher than the pressure exterior of the greenhouse.

The greenhouse may be operated by only recirculating air from within the greenhouse to the air conditioning zone and back to the interior of the greenhouse. In this mode no external air is let in and the openings in the ridge beam may suitably be closed or only opened if the pressure within the greenhouse has to be decreased. In another mode of operation air from the exterior of the greenhouse is let into the air conditioning zone only and discharged via the openings in the ridge beam. No recirculation of the air from within the greenhouse via the air conditioning zone takes place. This mode may be omitted because it has been found that a minimal recirculation is favourable. In the third and most used mode of operation air from the exterior of the greenhouse is mixed with air from within the greenhouse in the air conditioning zone and fed to the interior of the greenhouse via the ventilation ducts. The net excess air entering the greenhouse will be discharged via the openings in the ridged beam in order to avoid that the pressure within the greenhouse exceeds its safe limits. Optionally additional openings may be present to discharge the excess air.

The ventilating ducts may be any device which provides a substantially even distribution of the air into the greenhouse. Preferably the air is discharged from these ducts in the greenhouse at a position below the cultivation. Examples of such ventilating conduits are for example described in EP1464219, WO0076296, NL1038219 and in US2010/0126062.

The air conditioning zone is suitably provided with means to cool, heat, humidify or dehumidify the air before it is distributed into the greenhouse. Such means are well known and for example described in WO2004032606, WO0076296, WO2015/012698 and WO2008002686.

The invention is also directed to the ridge beam as described above and further illustrated in the Figures.

The invention is also directed to a process to condition the air within a greenhouse comprising of transparent walls and a structure comprising of one or more ridge beams as part of a roof of the greenhouse by maintaining a pressure difference between the average pressure within the greenhouse and the pressure exterior to the greenhouse, taking in air from the exterior of the greenhouse and mixing this air with air taken from the interior of the greenhouse to obtain conditioned air, distributing the conditioned air via a forced flow to the interior of the greenhouse, and discharging a volume of air from the interior of the greenhouse via openings present in the one or more ridge beams such to maintain the pressure difference.

The area of openings in the ridge beam per axial length of the ridge beam is preferably between 0.01 and 0.1 m$^2$/m and more preferably between 0.01 and 0.04 m$^2$/m.

The discharge of air via the openings of the ridge beam is suitably controlled such that the pressure within the greenhouse is between 0 and 100 Pa higher and preferably between 10 and 20 Pa higher than the pressure exterior of the greenhouse.

Preferably the volume of air discharged via the openings in the ridge beam is performed via openings at the leeward side of the ridge beam in a situation that a flow of external air flows over the ridge beam under an angle thereby defining a leeward and windward side of the ridge beam. This is advantageous for the reasons earlier discussed.

Preferably the discharge of air via the openings in the ridge beam is performed via openings which direct the air in a side ways direction relative to the ridge beam. For this process a rotatable valve rotating over an axis parallel to the ridge beam is used to either direct the majority of the air to one side or to the other side. More preferably the process is performed in the greenhouse according to the invention.

BRIEF DESCRIPTION OF THE DRAWINGS

The invention will be illustrated by means of the following non-limiting Figures.

FIG. 1 shows a view of ridge beam.
FIG. 2 shows a view of the design for a rotating valve.
FIG. 3 shows a cross-sectional view of a valve.
FIG. 4 shows a cross-sectional view of a valve.
FIG. 5 shows a view of a section of a valve.
FIG. 6 shows a view of valve.
FIGS. 7a, 7b, and 7c show views of a valve.
FIG. 8 shows a view of a greenhouse.
FIG. 9 shows a cross-sectional view of a valve.

DETAILED DESCRIPTION OF THE INVENTION

Figure 10A:
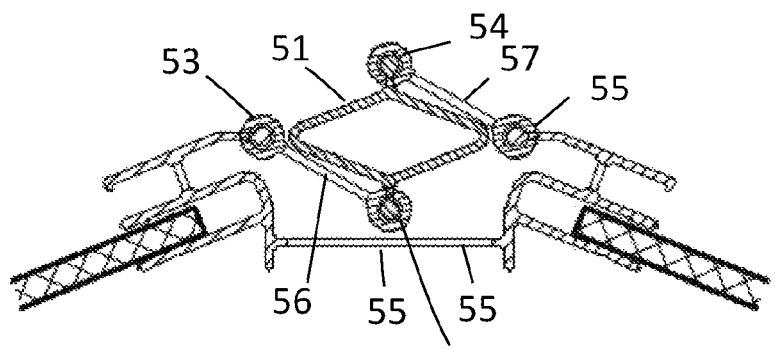
FIGS. 10a, 10b, and 10c show views of a ridge beam.

FIG. 1 shows a ridge beam 4 having an upper part, which in use extends some distance above a roof 5 of a greenhouse 1. The roof 5 is composed of glass panels 2 which fit in an elongated sleeve of the ridge beam 4 as shown. The upper part comprises of two elongated side zones 6,7 present at either side of the upper part of the ridge beam 4. The ridge beam 4 is comprised of stationary part 3a which is part of the structure 3 of the greenhouse and one or more elongated hollow spaces 8. The ridge beam 4 is provided with one or more closable openings 9 in both side zones 6,7.

FIG. 1 further shows that the hollow space 8 of the ridge beam 4 has a tubular shape. In this hollow space 8 a valve 18 is rotatably positioned. The valve 18 is provided with openings 22a which aligns with opening 9 at side 7 as shown and opening 22b suited to align with opening 9 at side 6 in another rotatable position of valve 18. A surface 23 present along the length of valve 18 closes opening 9 at side 6 in the valve 18 position shown in FIG. 1.

In this figure the opening 9 at side zone 7 aligns with opening 22a of valve 18 and fluidly connects the exterior 10 of the greenhouse 1 with the elongated hollow space 8 of the ridge beam 4. An opening 11 at the lower end 12 of the ridge beam 4 aligns with opening 22b of valve 18 and fluidly connects the interior 13 of the greenhouse 1 with the elongated hollow space 8. By consequence the interior 13 of the greenhouse 1 is fluidly connected via opening 9 at side 7 with the exterior 10 of the greenhouse 1. By rotating valve 18 clock wise the size of opening 9 at side 7 and the size of opening 11 shall become smaller. In this manner it is possible to vary the flow of air leaving the greenhouse 1 and to control the pressure difference between the interior 13 and the exterior 10 of the greenhouse. By rotating the valve 18 even further opening 9 at side 7 may be fully closed and opening 9 at side 6 will align with opening 22b of valve 18 and opening 11 will align with opening 22a. In this position the interior 13 of the greenhouse 1 is fluidly connected via opening 9 at side 6 with the exterior 10 of the greenhouse 1. This illustrates that the ridge beam having a valve 18 is able to open at either side of the ridge beam and close at its opposite side. The ridge beam 4 having a valve 18 shall be further illustrated in FIGS. 3-6.

FIG. 2 shows another design for the rotating valve. The upper end part of the ridge beam 4 is an elongated cap valve 30 which can rotate along an axis 31 running parallel with the ridge beam 4. Axis 31 runs within the hollow space 8 of the ridge beam 4. The cap valve 30 comprises a curved section 27 of a tube cut along its length, an elongated surface 26 connected to the curved section 27 and a hollow opening 28 running in the middle of the elongated surface. Hollow opening 28 is rotatably connected to an axis 29 which is part of the lower stationary part 12 of the ridge beam 4. The curved section 27 as shown has an angle of about 180° and may have an angle of between 60 and 270°. The angle is here defined as the angle α between the two planes running from the ends of curved section 27 to axis 31. At the lower angles range for section 27 it is desirable to provide the ridge beam 4 with curved walls 29a and 29b. The cap valve 30 is shaped such that in a first rotatable position one or more openings 9 in the first elongated side zone 6 are present which in use fluidly connect the exterior 10 of the greenhouse 1 with the elongated hollow space 8 of the ridge beam 4 and wherein the second elongated side zone 7 is closed by the cap valve 30 and in a second rotatable position one or more openings 9 in the second elongated side zone 7 are present which in use fluidly connect the exterior 10 of the greenhouse with the elongated hollow space 8 of the ridge beam 4 and wherein the first elongated side zone 6 is closed by the cap valve 30.

FIG. 3 shows a cross section of valve 18 showing surface 23 and polymer parts 33, 34 and 35. Polymer parts 33, 34 and 35 extend a small distance radially outwards and provide a sliding surface which contacts the interior of hollow space 8 of ridge beam 4. In FIG. 4 polymer parts 33, 34 and 35 are shown separately. The parts are separate parts to enable an easier assembly with valve 18.

FIG. 5 shows a section of valve 18. Two rows 20 and 21 of openings 22a and 22b respectively. Elongated surface 23 separates the inner tubular space of the valve 18 into an elongated space 24 fluidly connected to the two rows 20,21 of openings 22a,22b and a remaining space 25. The polymer part 33 is shown half way the section of valve 8 providing separated hollow spaces 8. Connecting means 36 are provided to connect to the illustrated section to a next section of the valve 18.

FIG. 6 shows a valve 18 as present inside a section of the ridge beam 4 of FIG. 1. The rotational position of valve 18 in this figure is such that the interior 13 of the greenhouse 1 is not fluidly connected to the exterior 10 of the greenhouse 1 via the openings 9 of the ridge beam 4. Surface 23 encloses opening 11 (not visible) from the hollow space 8. The valve may be changed from one position to another position by rotation along an axis 39 running parallel with the ridge beam 4. The valve 18 is connected to a transmission (not visible) which in turn is rotatably connected to a motor 39a positioned below the section of ridge beam 4. Further connecting means 38 and 38a are shown which are used to connect the section of ridge beam 4 to a next section of ridge beam 4. Also the section of valve 18 is connected to a next section of valve 18 by connecting means 18. In this way one motor 39a may rotate a multiple of sections of the ridge beam.

FIG. 7a-c shows a variant of the valve 18 of FIG. 6. The rotating valve comprises an elongated segment of a cylinder 23a which in use can rotate within an tubular elongated space 8. The elongated segment of a cylinder 23a is provided with support parts 24a, which support parts 24a will in use rotate within tubular housings 25a. The support parts 24a and corresponding tubular housings 25a are spaced apart along the ridge beam such to create openings 9. Tubular housing 25a and optional further supports 26a are preferably disconnectable. In FIG. 7a the valve 18a is shown in a closed position wherein the interior 13 of the greenhouse 1 is fluidly closed from the elongated space 8 and opening 9. In FIG. 7b a valve 18a rotational position is shown wherein the interior 13 of the greenhouse is fluidly connected to an opening 9 at side 7. In FIG. 7c a rotational position of valve 18a is shown wherein the interior 13 of the greenhouse is fluidly connected to opening 9 at side 6. This design enables one to more easily remove the valve 18a by simply disconnecting tubular housings 25a. Further less contact area will result and thus less risk that the system would block.

FIG. 8 shows a greenhouse 1 with three saddle roofs 5 each provided with a ridge beam 4 according to this invention and a gutter 48. A commercial greenhouse may have between 1 and 100 or even more than 100 of such saddle roofs 5. At the floor of the greenhouse 1 seven ducts 44 are shown. A greenhouse may have between 2 and 250 or even more of such parallel positioned ducts 44. The ducts 44 run parallel with the ridge beam 4 in FIG. 8. It is also possible to position the ducts 44 perpendicular to the direction of the ridge beam 4. Air is distributed from these ducts via openings 50 to the interior 13 of the greenhouse. The driving force for this distribution of air is provided with fans 49 at one end of the duct. The opposite end of duct 44 is closed. The air entering fans 49 is preferably conditioned in an air conditioning mixing zone as shown in FIG. 8.

FIG. 9 shows a cross section AA' of semi-closed greenhouse shown in FIG. 8 provided with means 40 to take in air from the exterior 10 of the greenhouse. The means 40 are openings in a side wall of the greenhouse which may be opened or closed by means of a shutter 43. Further an air conditioning mixing zone 41 is shown where air from the exterior and air 45 from within the greenhouse 1 can mix. The thus mixed air is distributed to the interior of the greenhouse using means 49, suitably a fan connected to a ventilating duct 44. Preferably multiple and parallel oriented ventilation ducts are present to evenly distribute the air 43 in the greenhouse. The mixing zone 41 is preferably a single space running along one side of the greenhouse. The position of shutter 47 is preferably elevated enough to achieve a flow of air in the direction of shutter 47 which is substantially above the vegetation in the greenhouse. The amount of air 45 from within the greenhouse entering the mixing zone may be controlled by shutter 47. By controlling shutters 47 and 43 and the openings in ridge beam 4 and the ventilating power of fans 49 one may achieve the different modes of operation as discussed above. The amount of air entering the greenhouse via means 40 will be about the same amount of air leaving the greenhouse via the openings in ridge beam as air 46.

Figure 10B:
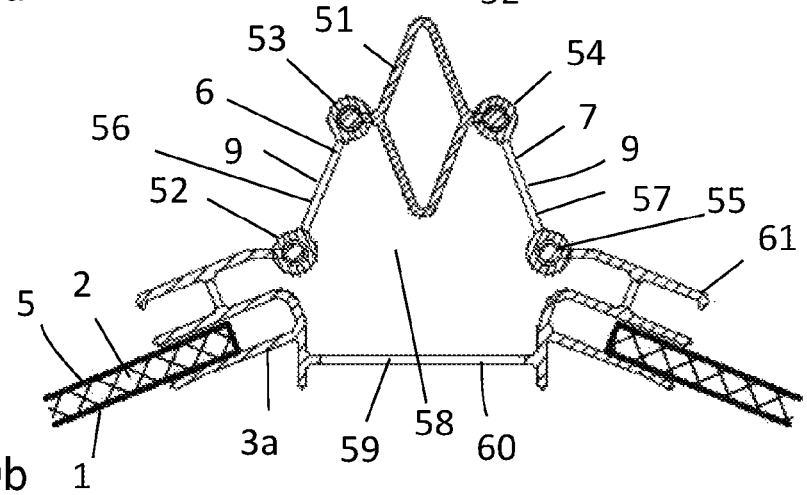
Figure 10C:
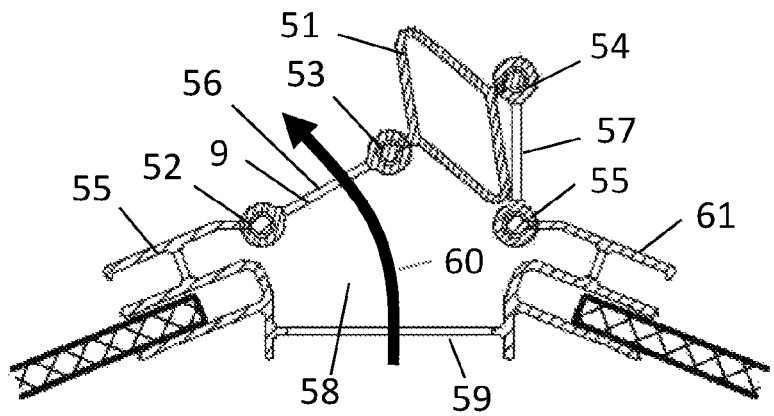

FIG. 10a-c shows another example of a ridge beam according to the invention. FIG. 10b shows a ridge beam 61 having openings 9 at either side 6,7 of the ridge beam 4. A first wall part 56 is present as the elongated side zone 6 and a second wall part 57 as the opposite elongated side zone 7. The wall parts 56,57 are rotatably connected to the fixed part 3a of the ridge beam at their lower ends via elongated hinges 52, 55. The wall parts 56,57 are further both rotatably connected to an elongated bridging part 51 at their upper ends via elongated hinges 53,54. The axis of rotation of all four rotatable connections or hinges 52,53,54,55 run parallel with the elongated ridge beam 4. The hinges 52,53,54,55 are elongate curved ends running along the length of the fixed part 3a, the wall part 56, the bridging part 51, the wall part 57 and again fixed part 3a.

Hinges 52,53,54,55 enable that the bridging part can tilt in different positions and at least from the positions shown in FIGS. 10a-c to another illustrated position. A hollow space 58, an opening 59 at the lower end 60 of the ridge beam 61 is shown. In FIG. 10a the bridging part 51 closes openings 9 at either side 6 and 7 of the ridge beam. In FIG. 10b the interior 13 of the greenhouse is fluidly connected with hollow space 58 which in turn is fluidly connected with openings 9 at either side 6,7 of the ridge beam 61. In FIG. 10c the valve 51 encloses only openings 9 at side 7 while the openings 9 at side 6 are open and fluidly connect to the hollow space 58 and to the interior 13 of the greenhouse via opening 59. Air flow 60 illustrates the flow path of the air as discharged from the greenhouse to the exterior.

Figure 11:
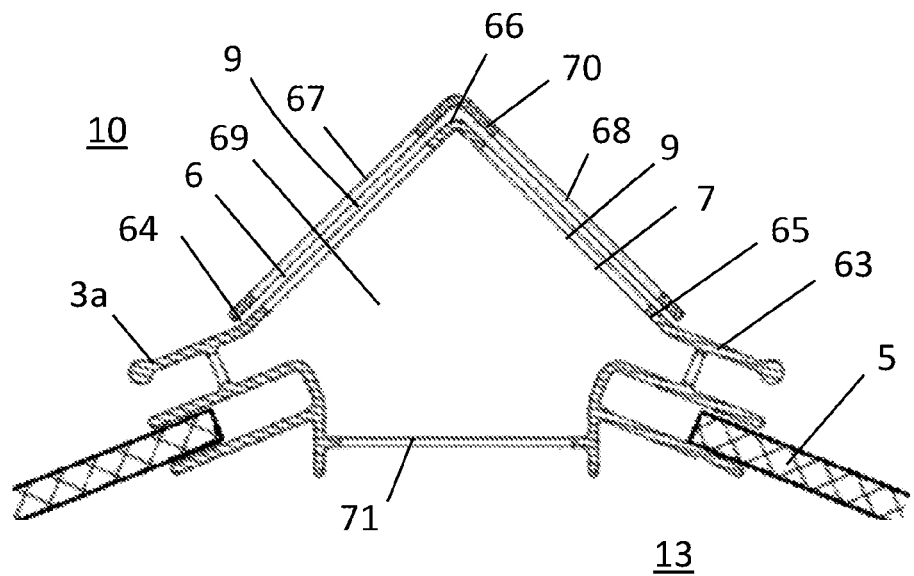
FIG. 11 shows a view of a ridge beam.
Figure 12:
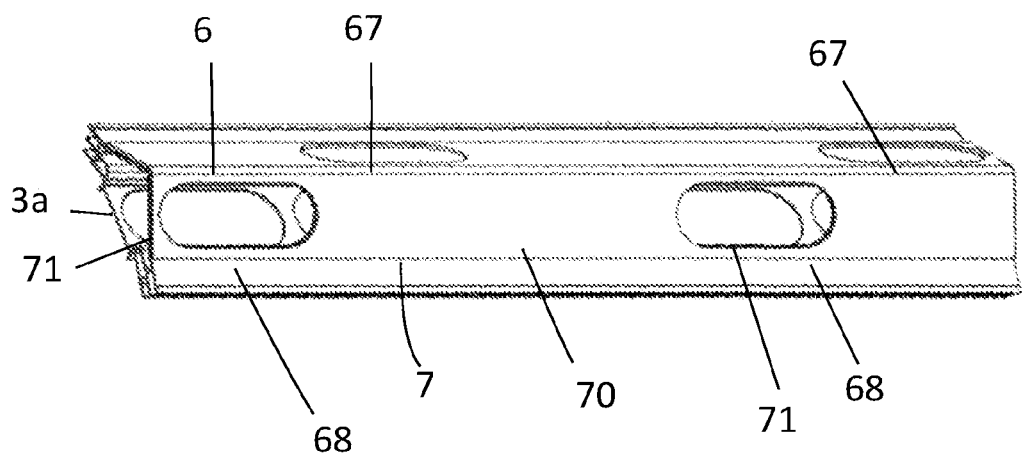
FIG. 12 shows a view of a ridge beam.

FIG. 11 shows another example of a ridge beam 63 according to the invention. The ridge beam 4 is comprised of stationary part 3a which is part of the structure 3 of the greenhouse. The ridge beam 63 has an upper part, which in use extends some distance above a roof 5 of a greenhouse 1. The upper part comprises of two elongated side zones 6,7 present at either side of the upper part of the ridge beam 63. The elongated upper part of composed of two elongated and upwardly extending walls 64,65 which meet at their upper ends 66. The walls 64 and 65 are provided with openings 9. On top of walls 64,65 a screen 70 is present which functions like the earlier described valve by being moveable in the elongated direction of the beam ridge 63. The screen 70 is provided with openings 67, 68 which, depending on the position of the screen 70, may align with openings 9 in either side 6 or side 7. When the openings 68 align with openings 9 in side 7 a fluid connection is provided via these openings, the hollow space 69 and lower opening 70, between the exterior and interior of the greenhouse as shown in FIG. 12. When the openings 67 (not visible in FIG. 11) in screen 70 align with openings 9 in side 6 a fluid connection is provided via these openings, the hollow space 69 and lower opening 71, between the exterior and interior of the greenhouse (not shown). In a third position all openings 9 on either side are enclosed (not shown).

The ridge beam as illustrated in FIGS. 1-6, 9 and 10 are preferably metal extrusion profiles.

The invention claimed is:

1. A process for conditioning the air within a greenhouse comprising transparent walls and a structure including one or more ridge beams as part of a roof of the greenhouse, the process comprising:
maintaining a pressure difference between an average pressure within the greenhouse and a pressure exterior to the greenhouse;
taking in air from the exterior of the greenhouse and mixing this air with air taken from the interior of the greenhouse to obtain conditioned air;
distributing the conditioned air via a forced flow to the interior of the greenhouse; and
discharging a volume of air from the interior of the greenhouse via openings present in the one or more ridge beams such to maintain the pressure difference,
wherein the discharge of air via the openings in the one or more ridge beams is performed via openings that direct the air in a sideways direction relative to the one or more ridge beams, and
wherein a rotatable valve rotating over an axis parallel to the one or more ridge beams is used to either direct the majority of the air to one side or to the other side.

2. A process according to claim 1, wherein the area of openings in the one or more ridge beams per axial length of the one or more ridge beams is between 0.01 m²/m and 0.1 m²/m.

3. A process according to claim 1, wherein the volume of air discharged via the openings in the one or more ridge beams is performed via openings at a leeward side of the one or more ridge beams in a situation that external air flows over the one or more ridge beams at an angle thereby defining a leeward and windward side of the one or more ridge beams.

4. A process for conditioning the air within a greenhouse comprising transparent walls and a structure including one or more ridge beams as part of a roof of the greenhouse, the process comprising:
maintaining a pressure difference between an average pressure within the greenhouse and a pressure exterior to the greenhouse;
taking in air from the exterior of the greenhouse and mixing this air with air taken from the interior of the greenhouse to obtain conditioned air;
distributing the conditioned air via a forced flow to the interior of the greenhouse; and
discharging a volume of air from the interior of the greenhouse via openings present in the one or more ridge beams such to maintain the pressure difference,
wherein the greenhouse comprises:
transparent walls; and
a structure including at least one ridge beam as part of a roof of the greenhouse,
wherein the at least one ridge beam extends a distance above the roof defining two elongated side zones present above the roof and at either side of the ridge beam,
wherein the at least one ridge beam includes one or more elongated hollow spaces,
wherein the at least one ridge beam is provided with one or more closable openings in both side zones, the openings fluidly connecting the exterior of the greenhouse with the one or more elongated hollow spaces of the at least one ridge beam, and
wherein the at least one ridge beam is provided with one or more openings at its lower end fluidly connecting the interior of the greenhouse with the one or more elongated hollow spaces of the at least one ridge beam,
wherein the at least one ridge beam comprises an elongated valve and a fixed part, the valve is movable between at least (i) a first position relative to the fixed part. wherein the one or more openings in a first elongated side zone fluidly connecting the exterior of the greenhouse with the one or more elongated hollow spaces of the at least one ridge beam,
wherein the one or more openings in an opposite second elongated side zone are closed, and (iii) a second position relative to the fixed part wherein the one or more openings in the second elongated side zone fluidly connect the exterior of the greenhouse with the one or more elongated hollow spaces of the at least one ridge beam, and
wherein the one or more openings in the first elongated side zone are closed.

5. A process according to claim 1, wherein the roof has a shape of a number of parallel oriented saddle roofs that are each provided with the at least one ridge beam.

6. A process according to claim 1, wherein the greenhouse is of a tunnel type and the transparent walls are transparent polymer sheets.

7. A process according to claim 1, wherein the greenhouse is provided with means to take in air from the exterior of the greenhouse, an air conditioning mixing zone suited to mix air from the exterior of the greenhouse with air from within the greenhouse, and means to distribute air from the air conditioning zone to the interior of the greenhouse via a multitude of ventilation ducts fluidly connected to the air conditioning mixing zone.

8. A process according to claim 4, wherein the valve is movable to a third position relative to the fixed part that results in the interior of the greenhouse being not fluidly connected to the exterior of the greenhouse via the openings of the at least one ridge beam.

9. A process according to claim 4, wherein the valve is movable to intermediate positions relative to the fixed part, and
wherein the size of the one or more openings in one of the two elongated side zones and/or the size of the opening at the lower end of the at least one ridge beam can be varied while the one or more openings of the other elongated side zone are closed.

10. A process according to claim 4, wherein the valve is a screen that can change from one position to another position by a movement in the direction of the at least one ridge beam.

11. A process according to claim 10, wherein the valve is a moveable screen provided with openings that are positioned in screen such that the screen may close or open the openings at either of the elongated size zones depending on its position relative to the two elongated zones.

12. A process according to claim 4, wherein the valve changes from one position to another position by rotation along an axis running parallel to the at least one ridge beam,
wherein the hollow space of the ridge beam has a tubular shape to form a tubular hollow space, and
wherein the valve is rotatably positioned within the tubular hollow space.

13. A process according to claim 12, wherein the valve is rotatably connected to a transmission that is rotatably connected to a motor positioned below the at least one ridge beam.

14. A process according to claim 12, wherein the valve is a tube provided with two parallel rows of openings and an elongated surface separating the tubular hollow space of the valve into an elongated space fluidly connected to the two rows of openings and a remaining space.

15. A process according to claim 12, wherein the valve includes an elongated segment of a cylinder that can rotate within a tubular elongated space as the tubular hollow space, and
wherein the elongated segment of a cylinder is provided with support parts that can rotate within tubular housings that are part of the fixed part and are spaced apart such to create openings.

16. A process according to claim 4, wherein the valve changes from one position to another position by rotation along an axis running parallel to the ridge beam, wherein the ridge beam has an upper end part and
wherein the upper end part of the ridge beam is an elongated cap valve that can rotate along an axis that runs parallel to the at least one ridge beam and runs within the hollow space of the at least one ridge beam, the cap valve being shaped such that (i) in a first rotatable position one or more openings in the first elongated side zone are present that fluidly connect the exterior of the greenhouse with the elongated hollow space of the at least one ridge beam, and wherein the second elongated side zone is closed by the cap valve, and (i) in a second rotatable position one or more openings in the second elongated side zone are present that fluidly connect the exterior of the greenhouse with the elongated hollow space of the at least one ridge beam and wherein the first elongated side zone is closed by the cap valve.

17. A process according to claim 16, wherein the valve is rotatably connected to a transmission that is rotatably connected to a motor positioned below the at least one ridge beam.

18. A process according to claim 4, wherein the valve is comprised of a first wall part as one elongated side zone and a second wall part as the opposite elongated side zone,
wherein the wall parts are rotatably connected to the fixed part of the at least one ridge beam at their lower ends,
wherein the wall parts are both rotatably connected to an elongated bridging part at their upper ends,
wherein the axis of rotation of all four rotatable connections run parallel to the at least one ridge beam such that the bridging part can tilt in different positions,
wherein in at least one position the bridging part closes the openings in one wall part and provides a fluid connection between the exterior of the greenhouse and the hollow spaces via the openings of the other wall part, and
wherein in at least another position the bridging part closes the openings of first and second wall part.

\* \* \* \* \*